United States Patent
Morgan

(10) Patent No.: US 7,398,896 B2
(45) Date of Patent: Jul. 15, 2008

(54) VEHICLE BODY SHEET METAL CLINCH NUT FEEDER

(75) Inventor: Phillip J. I. Morgan, Commerce Township, MI (US)

(73) Assignee: Utica Enterpries, Inc., Shelby Township, MI (US)

( * ) Notice: Subject to any disclaimer, the term of this patent is extended or adjusted under 35 U.S.C. 154(b) by 441 days.

(21) Appl. No.: 11/181,250

(22) Filed: Jul. 14, 2005

(65) Prior Publication Data

US 2007/0022593 A1 Feb. 1, 2007

(51) Int. Cl.
G07F 11/16 (2006.01)
(52) U.S. Cl. .......................... 221/270; 221/73; 221/79; 221/232; 221/238; 221/239; 221/29; 29/798
(58) Field of Classification Search .................... 221/73, 221/79, 210, 232, 238, 239, 270, 297, 251
See application file for complete search history.

(56) References Cited

U.S. PATENT DOCUMENTS

| | | | | |
|---|---|---|---|---|
| 4,785,529 A | * | 11/1988 | Pamer et al. .................. | 29/707 |
| 5,743,003 A | * | 4/1998 | Shinjo .......................... | 29/798 |
| 6,631,827 B2 | * | 10/2003 | Goodsmith et al. .......... | 221/238 |
| 2005/0258185 A1 | * | 11/2005 | Vrana ........................ | 221/232 |

* cited by examiner

Primary Examiner—Gene O. Crawford
Assistant Examiner—Timothy R Waggoner
(74) Attorney, Agent, or Firm—Brooks Kushman P.C.

(57) ABSTRACT

A vehicle body clinch nut feeder (22) includes a dispensing head (54) having an inlet passage (60) through which oriented clinch nuts (26) are fed single file. The leading clinch nut is moved laterally to between clamping portions (64a, 66a) of a pair of clamp members (64, 66) of a clamp (62) where a second feed actuator (80) subsequently moves the clamped clinch nut downwardly to an opening (78) in a delivery member (76) where a robot end effector (32) receives the clinch nut in preparation for a clinching operation. An alignment mount (58) supports the dispensing head (54) on a support (56) for a horizontal movement in perpendicular horizontal directions to insure alignment of the robot end effector (32) with the clinch nut (26) to be received.

14 Claims, 3 Drawing Sheets

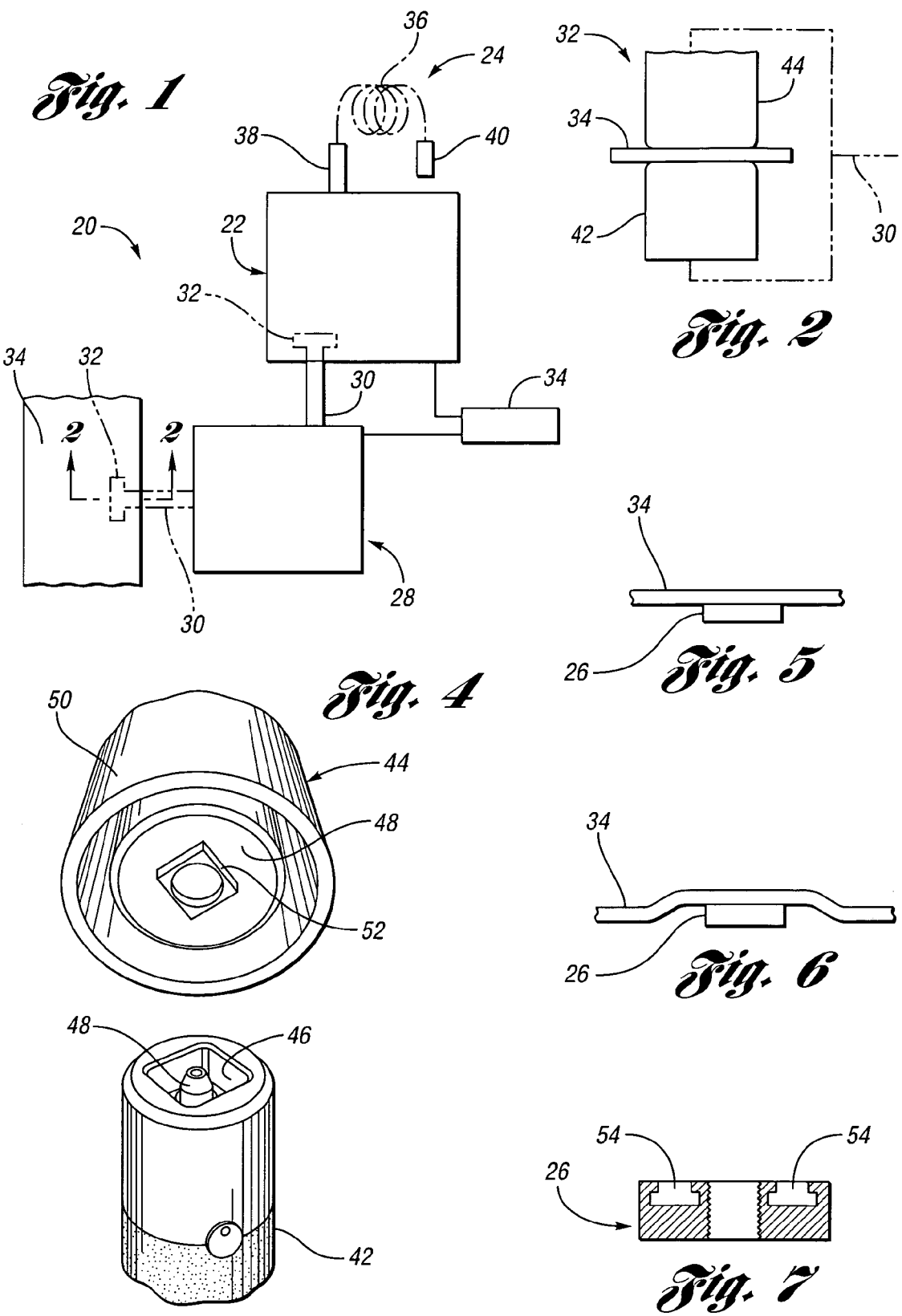

VEHICLE BODY SHEET METAL CLINCH NUT FEEDER

BACKGROUND OF THE INVENTION

1. Field of the Invention

This invention relates to a clinch nut feeder for feeding clinch nuts to a robot end effector of the type that is operable to clinch the nut to a vehicle body sheet metal component for use in providing attachment of other components.

2. Background Art

Vehicle body sheet metal components have previously had nuts welded to them to secure other vehicle components during the vehicle body assembly process. Clinch nuts have also been secured to vehicle body sheet metal components to provide attachment of other components such as disclosed by the U.S. Pat. No. 7,100,260 of Mark A. Savoy and Philip J. Morgan under the title Programmable Apparatus And Method For Body Panel And Clinch Nut Attachment, the entire disclosure of which is hereby incorporated by reference.

SUMMARY OF THE INVENTIONS

An object of the present invention is to provide an improved clinch nut feeder for feeding vehicle body sheet metal clinch nuts to a robot end effector utilized to provide securement of the clinch nut to a vehicle body sheet metal component.

In carrying out the above object, a vehicle body sheet metal clinch nut feeder constructed in accordance with the invention includes a dispensing head having an inlet passage through which oriented clinch nuts to be fed are received and moved single file. A clamp of the clinch nut feeder is mounted on the dispensing head and includes a pair of clamp members having clamping portions located laterally to one side of the inlet passage, and a resilient bias resiliently biases one of the pair of clamp members toward the other in a direction parallel to the direction of clinch nut movement through the inlet passage. A first feed actuator of the clinch nut feeder includes a feed member that is selectively operable to move the leading clinch nut in the inlet passage laterally from the inlet passage to the one lateral side of the inlet passage and between the clamping portions of the pair of clamp members for clamping therebetween by the operation of the resilient bias. A delivery member on the dispensing head is located below the clamp members and has an opening for receiving a robot end effector tool for receiving the clamped clinch nut at the one lateral side of the inlet passage, and a second feed actuator of the clinch nut feeder is selectively operable to move the clamped clinch nut at the one lateral side of the inlet passage downwardly from between the clamping portions of the pair of clamp members for delivery to the robot end effector tool within the delivery member opening.

The clinch nut feeder includes a support and an alignment mount that mounts the dispensing head on the support while permitting horizontal movement thereof in generally perpendicular horizontal directions to ensure alignment of the robot end effector tool within the delivery member opening for delivery of the clinch nut to the robot end effector. The alignment mount includes a first mount member having a first pivot connection to the support for pivoting about a first vertical axis and a second mount member having a second pivot connection on the first mount, member for pivoting about a second pivotal axis spaced from the first pivotal axis. The dispensing head is mounted on the second mount member for pivoting about the first and second vertical axes to provide the horizontal movement that aligns the robot end effector tool with the delivery member opening for delivery of the, clinch nut. The alignment mount also includes a mounting block that is mounted on the support and supports the first pivot connection that mounts the first mount member for pivotal alignment movement about the first axis.

The first feed actuator of the clinch nut feeder includes a first cylinder that moves the feed member to move the leading clinch nut in the inlet passage laterally from the inlet passage to between the pair of clamp members for the clamping therebetween by the operation of the resilient bias. The first cylinder of the first feed actuator has a piston connecting rod that is connected to the feed member and is moved in the same direction as the feed member laterally with respect to the inlet passage.

The second feed actuator includes a second feed member and a second cylinder that moves the second feed member to move the clamped clinch nut downwardly from between the pair of clamp members for delivery to the robot end effector tool within the delivery member opening. The second feed actuator includes a lever having first and second ends and an intermediate portion pivotally supported on the dispensing head by a pivotal connection. Another pivotal connection pivotally connects the second feed cylinder to the first end of the lever, and a further pivotal connection pivotally connects the second end of the lever to the second feed member to provide its movement that moves the clinch nut into the delivery member opening.

The pair of clamp members include stops against which the first feed actuator moves the clinch nut into alignment with the opening in the delivery member.

Also, the delivery member opening has a lower chamfer that facilitates the movement of the robot end effector tool thereinto to receive the clinch nut.

The objects, features and advantages of the present invention are readily apparent from the following detailed description of the preferred embodiment when taken in connection with the accompanying drawings.

BRIEF DESCRIPTION OF THE DRAWINGS

FIG. 1 is a schematic top plan view of a clinch nut applying system which includes a clinch nut feeder constructed in accordance with the present invention.

FIG. 2 is a view taken along the direction of line 2-2 in FIG. 1 to illustrate the manner in which clinch nuts are applied.

FIG. 3 is a perspective view illustrating a lower clinch nut tool of an end effector of a robot utilized to provide the clinch nut application.

FIG. 4 is a perspective view of an upper tool of the robot end effector utilized to provide the clinch nut application.

FIG. 5 is a view taken in the same direction as FIG. 2 illustrating an applied clinch nut.

FIG. 6 is a view similar to FIG. 5 showing the manner in which the sheet metal to which the clinch nut is applied can be deformed to provide for tolerance variations.

FIG. 7 is a sectional view through the clinch nut applied by the robot end effector.

DETAILED DESCRIPTION OF THE PREFERRED EMBODIMENT

Figure 8:
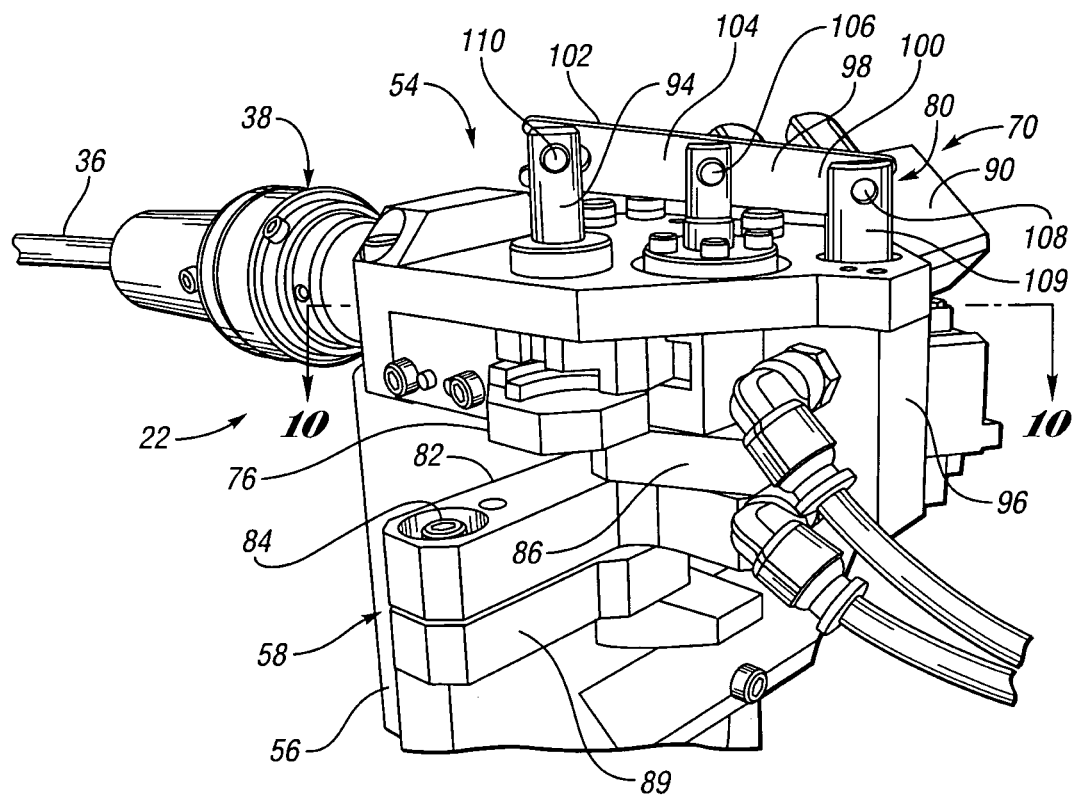
FIG. 8 is a perspective view of the clinch nut feeder of the invention.

With reference to FIG. 1, a vehicle body sheet metal clinch nut applying system is generally indicated by 20 and includes a clinch nut feeder 22 that is constructed in accordance with the present invention as is hereinafter more fully described. System 10 includes a supply 24 of clinch nuts 26 (FIG. 7) which are supplied thereto in a single file oriented manner. System 10 also includes a robot 28 whose arm 30 has an end effector 32 that is moved from the solid line indicated position to the phantom line indicated position to move a clinch nut received from the feeder 22 for clinching to a vehicle body sheet metal component 34. System 20 includes a central controller 34 that coordinates the operation of the feeder 32 and the robot 28 during the sheet metal clinch nut supply and clinching process.

With continuing reference to FIG. 1, the clinch nut supply 24 as shown includes a tubular coil 36 through which oriented the clinch nuts are supplied single file to the feeder 22 to its inlet 38. As shown, the clinch nuts are moved under the impetus of a source 40 of pressurized air or other gas. The nuts may be supplied to the coil 36 or directly to the feeder by a rotary sorter such as of any conventional type commercially available. It is possible for the clinch nut coil 36 to be replaced by another after all of its clinch nuts have been supplied to the feeder and it is also possible for the clinch nuts to be supplied to the coil through a load lock chamber in association with the pressurized air source 40.

As shown in FIG. 2, the robot end effector 32 includes a lower tool 42 which receives the clinch nut from the feeder 22 and also includes an upper tool 44 that cooperates with the lower tool to provide application of the clinch nut to the sheet metal components as shown in FIGS. 5 and 6. The lower tool 32 includes a square opening 46 that receives and holds the clinch nut against gravity. Within the lower tool opening 46, the lower tool has a central frustoconical upward projection 48 so as to insure that the clinch nut 26 is properly positioned on the lower tool. The upper tool 44 shown in FIG. 4 includes an inner tool punch 48 and an outer anvil 50 that is movable with respect to the tool punch in an axial direction which is vertical as shown in FIG. 2. The inner tool punch 48 has a punch portion 52 with a square outer shape and a round inner shape so as to force metal from the sheet metal component 34 into the opening 54 of the clinch nut 26 as shown in FIG. 7 and thereby provide securement of the clinch nut to the sheet metal component. Prior to the clinching securement of the nut to the sheet metal component, the robot end effector locates the outer anvil 50 axially with respect to the inner tool punch 48 to accommodate for variations in the location of the sheet metal component 34. If no adjustment is necessary, the resultant secured clinch nut adjustment is required, the sheet metal component is deformed as illustrated in FIG. 6.

For a more complete description of the clinch nut application apparatus and process, reference should be made to the aforementioned U.S. Pat. No. 7,100,260 of Mark A. Savoy and Philip J. Morgan, whose entire disclosure has been incorporated by reference.

With reference to FIG. 8, the clinch nut feeder 22 of the invention includes a dispensing head 54 that is mounted on a support 56, such as a frame or other base, by an alignment mount 58 that facilitates alignment of the clinch nut being fed with the robot end effector as is hereinafter more fully described. The alignment mount 58 is shown in greater detail in FIG. 9 and will be described later.

Figure 10:
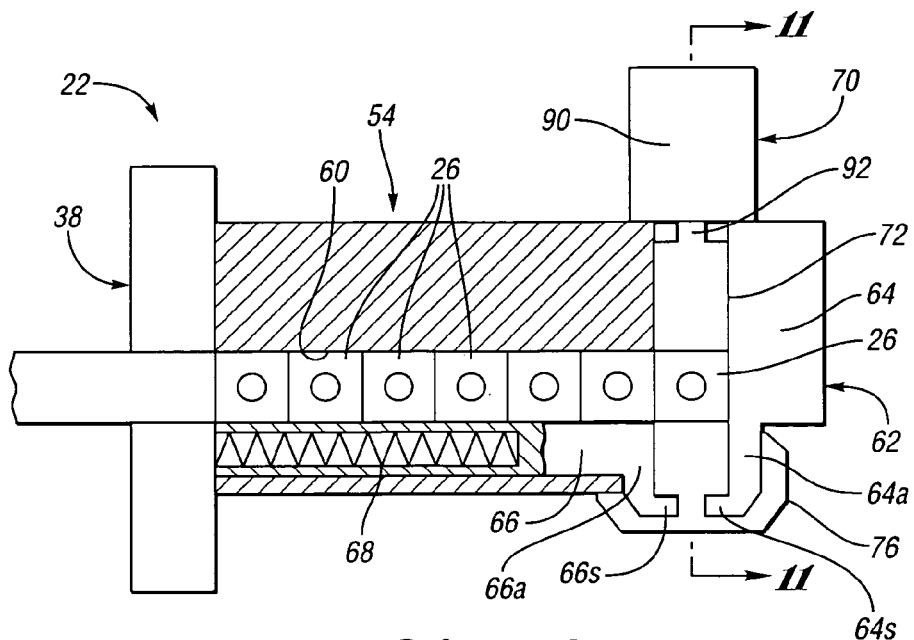
FIG. 10 is a partial sectional view taken through the dispensing head along the direction of line 10-10 in FIG. 8 to show the manner in which clinch nuts are fed single file in preparation for delivery.

As shown in FIG. 10, the dispensing head 58 includes an inlet passage 60 through which the oriented clinch nuts are fed and received and moved single file from the left toward the right. A clamp 62 is mounted on the dispensing head and includes a pair of clamp members 64 and 66 having clamping portions 64a and 66a located to one lateral side of the inlet passage 60. The single file line of clinch nuts 26 is moved toward the right and stopped by the one clamp member 64 as shown. A resilient bias 68 is provided as shown by a spring of the helical type that biases the clamp members toward each other in a direction parallel to the direction of clinch nut movement through the inlet passage 60 by biasing the one clamp member 66 toward the right in a direction toward the clamp member 64. While it is possible to resiliently bias both clamp members, it has been found that the resilient bias of a single clamp member is sufficient to provide the biasing of the clamp members toward each other in an effective manner.

Figure 11:
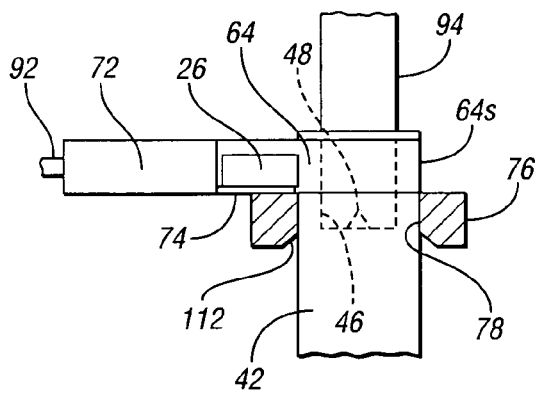
FIG. 11 is an elevational view taken along the direction of line 11-11 in FIG. 10 to show the manner in which a feed member is positioned with respect to the single file line of clinch nuts at the start of a cycle.
Figure 12:
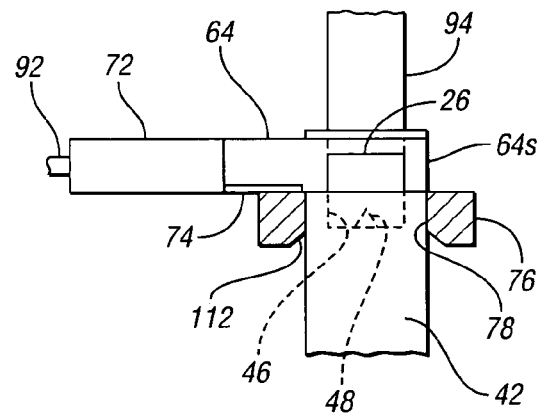
FIG. 12 is a view similar to FIG. 11 at a later stage after the feed member has moved the clinch nut to between a pair of clamp members above a delivery member that receives a lower tool of the robot end effector.
Figure 13:
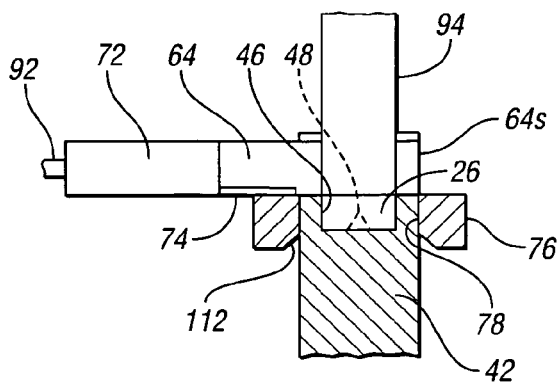
FIG. 13 is a view similar to FIG. 12 at a later stage after a second feed member has moved the quench nut downwardly for receipt by the lower tool of the robot end effector.

With continuing reference to FIG. 10, the feeder also includes a first feed actuator 70 having a feed member 72 that is selectively operable to move the leading clinch nut 26, i.e., the one most toward the right as illustrated, in the inlet passage 60 in a lateral direction from the inlet passage to between the clamping portions 64a and 66 of the pair of clamp members for clamping therebetween at the one lateral side of the inlet passage 60 by the operation of the resilient bias 68. In other words, the clinch nut 26 farthest toward the right is moved downwardly as illustrated in FIG. 10 to between clamping portion 64a and 66a of the clamp members. Feed member 72 includes a lower thin projection 74 that slides under the leading clinch nut 26 to prevent downward movement thereof until the clamp members have clamped the clinch nut between the clamping portions 64a and 66a. Thereafter, the feed member 72 is moved back to its initial position, as shown in FIG. 11 in preparation for the next cycle. Below the clamping portions 64a and 66a of the clamp members, the dispensing head includes a delivery member 76 which has an opening 78 for receiving the robot end effector lower tool 42 as shown in FIGS. 11-13. A second feed actuator generally identified by 80 in FIG. 8 is operable to move the clamped clinch nut downwardly from between the clamping portions 64a and 66a of the clamp members shown in FIG. 10 so that the clinch nut 26 at the one lateral side of the inlet passage 60 moves downwardly from the position of FIG. 12 to the position of FIG. 13 onto the end effector lower tool 42.

Figure 9:
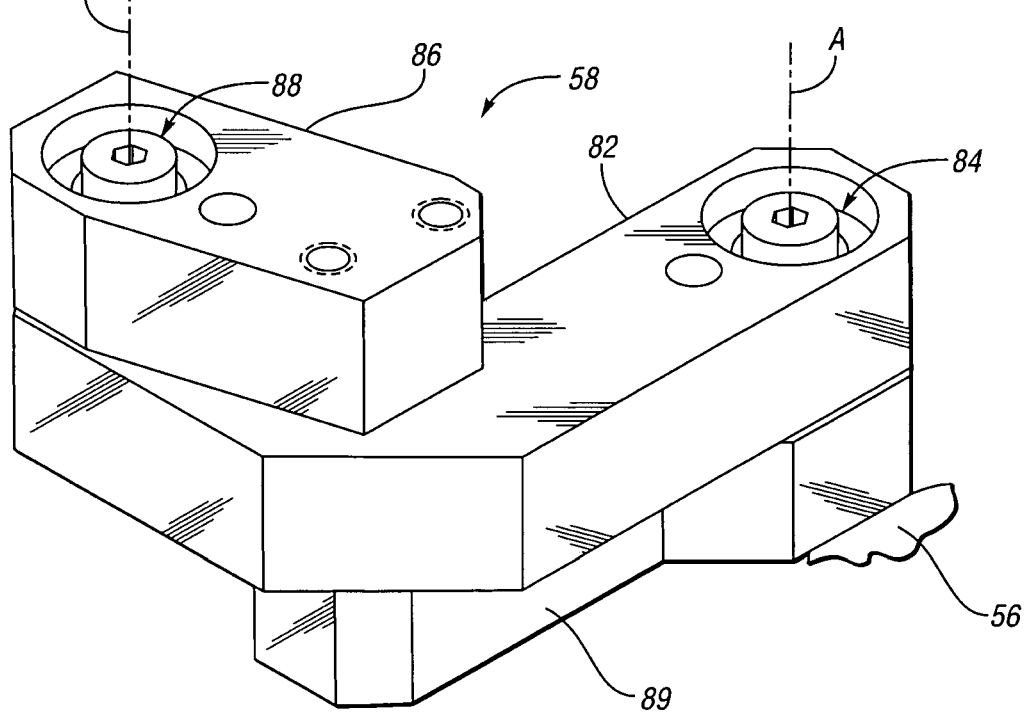
FIG. 9 is a perspective view illustrating an alignment mount that mounts a dispensing head of the clinch nut feeder on an associated support for providing alignment during clinch nut delivery to the robot end effector by the clinch nut feeder.

The alignment mount 58 illustrated in FIGS. 8 and 9 mounts the dispensing head 54 on the support while permitting horizontal movement thereof in generally perpendicular horizontal directions to insure alignment of the robot end effector lower tool with the delivery member for delivery of the clinch nut 26 to the robot end effector on its lower tool as described above in connection with FIGS. 10-13. More specifically, the alignment mount 58 includes a first mount member 82 having a first pivotal connection 84 to the support 56 about a first vertical axis A. A second mount member 86 of the alignment mount 58 has a second pivotal connection 88 on the first mount member 82 about a second pivotal axis B spaced from the first pivotal axis A. The alignment mount 58 also includes a mounting block 89 that is mounted on the support and secured in any suitable manner such as by bolts. This mounting block 89 supports the first pivot connection 84 that mounts the first mount member 82 for pivotal alignment movement on the support 56 about the first axis A. Suitable bolt or other fastener securement of the dispensing head onto the second mount member 86 thus provides for pivoting about the first and second vertical axis A and B to provide the horizontal movement in perpendicular horizontal directions that initially aligns the robot end effector lower tool with the delivery member opening for the clinch nut delivery illustrated in FIGS. 11-13.

As best illustrated in FIG. 10, the first feed actuator 70 includes a first feed cylinder 90 that moves the feed member 72 to move the leading clinch nut 26 in the inlet passage 60 laterally from the inlet passage to between the pair of clamp members 62 and 64 at their clamping portions 64a and 66a. A piston connecting rod 92 of the first feed cylinder 90 is connected to the first feed member 72 and moves in the same direction as the first feed member laterally with respect to the inlet passage 60.

The second feed actuator generally designated by 80 in FIG. 8 includes a second feed member 94 and a second feed cylinder 96 that moves the second feed member to move the clamped clinch nut 26 downwardly from the position of FIG. 12 to the position of FIG. 13 onto the end effector lower tool 42 as previously described. As shown in FIG. 8, the second feed actuator 80 includes a lever 98 including first and second ends 100 and 102 and an intermediate portion 104 pivotally supported on the dispensing head by a pivotal connection 106. Another pivotal connection 108 pivotally connects the piston connecting rod 109 of the second feed cylinder 96 to the first end 100 of the lever 98, and a further pivotal connection 110 pivotally connects the second lever end 102 to the second feed member 94.

As shown in FIG. 10, the pair of clamp members 64 and 66 have their clamping portions 64a and 66a provided with stops 64s and 66s against which the first feed actuator 70 moves the clinch nut into alignment with the opening in the delivery member 76 that is mounted below the clamp members as shown in FIGS. 12-13. As also shown in the latter figures, the delivery member 76 has its opening 78 provided with a lower chamfer 112 that facilitates the movement of the robot end effector lower tool 32 upwardly into the opening to receive the clinch nut as previously described.

While the preferred embodiment of the invention has been illustrated and described, it is not intended that this embodiment illustrates and describes all possible forms of the invention. Rather, the words used in the specification are words of description rather than limitation, and it is understood that various changes may be made without departing from the spirit and scope of the invention as defined by the following claims.

What is claimed is:

1. A vehicle body sheet metal clinch nut feeder, comprising:
    a dispensing head having an inlet passage through which oriented clinch nuts to be fed are received and moved single file;
    a clamp mounted on the dispensing head and including a pair of clamp members having clamping portions located laterally to one side of the inlet passage;
    a resilient bias that resiliently biases one of the pair of clamp members toward the other in a direction parallel to the direction of clinch nut movement through the inlet passage;
    a first feed actuator including a feed member that is selectively operable to move the leading clinch nut in the inlet passage laterally from the inlet passage to the one lateral side of the inlet passage and between the clamping portions of the pair of clamp members for clamping therebetween by the operation of the resilient bias;
    a delivery member on the dispensing head below the clamp members and having an opening for receiving a robot end effector tool for receiving the clamped clinch nut at the one lateral side of the inlet passage; and
    a second feed actuator that is selectively operable to move the clamped clinch nut at the one lateral side of the inlet passage downwardly from between the clamping portions of the pair of clamp members for delivery to the robot end effector tool within the delivery member opening.

2. A vehicle body sheet metal clinch nut feeder as in claim 1 further including a support and an alignment mount that mounts the dispensing head on the support while permitting horizontal movement thereof in generally perpendicular horizontal directions to ensure alignment of the robot end effector tool within the delivery member opening for delivery of the clinch nut to the robot end effector.

3. A vehicle body sheet metal clinch nut feeder as in claim 2 wherein the alignment mount includes a first mount member having a first pivot connection to the support for pivoting about a first vertical axis, the alignment mount including a second mount member having a second pivot connection on the first mount member for pivoting about a second pivotal axis spaced from the first pivotal axis, and the dispensing head being mounted on the second mount member for pivoting about the first and second vertical axes to provide the horizontal movement that aligns the robot end effector tool with the delivery member opening for delivery of the clinch nut.

4. A vehicle body sheet metal clinch nut feeder as in claim 3 wherein the alignment mount further includes a mounting block that is mounted on the support and supports the first pivot connection that mounts the first mount member for pivotal alignment movement about the first axis.

5. A vehicle body sheet metal clinch nut feeder as in claim 1 wherein the first feed actuator includes a first cylinder that moves the feed member to move the leading clinch nut in the inlet passage laterally from the inlet passage to between the clamping portions of the pair of clamp members for the clamping therebetween by the operation of the resilient bias on the one lateral side of the inlet passage.

6. A vehicle body sheet metal clinch nut feeder as in claim 5 wherein the first cylinder of the first feed actuator has a piston connecting rod that is connected to the feed member and is moved in the same direction as the feed member laterally with respect to the inlet passage.

7. A vehicle body sheet metal clinch nut feeder as in claim 1 wherein the second feed actuator includes a second feed member and a second feed cylinder that moves the second feed member to move the clamped clinch nut downwardly from between the clamping portions of the pair of clamp members for delivery to the robot end effector tool within the delivery member opening.

8. A vehicle body sheet metal clinch nut feeder as in claim 7 wherein the second feed actuator includes a lever including first and second ends and an intermediate portion pivotally supported on the dispensing head by a pivotal connection, another pivotal connection that pivotally connects the second feed cylinder to the first end of the lever, and a further pivotal connection that pivotally connects the second end of the lever to the second feed member.

9. A vehicle body sheet metal clinch nut feeder as in claim 1 wherein the first feed actuator includes a first cylinder that moves the feed member to move the leading clinch nut in the inlet passage laterally from the inlet passage to between the clamping portions of the pair of clamp members for the clamping therebetween by the operation of the resilient bias, and the second feed actuator including a second feed member and a second cylinder that moves the second feed member to move the clamped clinch nut downwardly from between the pair of clamp members for delivery to the robot end effector tool within the delivery member opening.

10. A vehicle body sheet metal clinch nut feeder as in claim 1 wherein the pair of clamp members include stops against which the first feed actuator moves the clinch nut into alignment with the opening in the delivery member.

11. A vehicle body sheet metal clinch nut feeder as in claim 1 wherein the delivery member opening has a lower chamfer that facilitates the movement of the robot end effector tool thereinto to receive the clinch nut.

12. A vehicle body sheet metal clinch nut feeder as in claim 1 wherein the clamping portions of the pair of clamp members include stops against which the first feed actuator moves the clinch nut into alignment with the opening in the delivery member, and the delivery member opening having a lower chamfer that facilitates the movement of the robot end effector tool thereinto to receive the clinch nut.

13. A vehicle body sheet metal clinch nut feeder, comprising:
    a support;
    a dispensing head;
    an alignment mount that mounts the dispensing head on the support for horizontal alignment movement;
    the dispensing head having an inlet passage through which oriented clinch nuts to be fed are received and moved single file;
    a clamp mounted on the dispensing head and including a pair of clamp members located laterally to one side of the inlet passage;
    a resilient bias that resiliently biases one of the pair of clamp members toward the other;
    a first feed actuator including a first feed cylinder and a first feed member that is selectively moved by the first feed cylinder to move the leading clinch nut in the inlet passage laterally from the inlet passage to between the pair of clamp members for clamping therebetween by the operation of the resilient bias;
    a delivery member on the dispensing head below the clamp members and having an opening for receiving a robot end effector tool as the alignment mount permits any necessary horizontal alignment movement of the dispensing head; and
    a second feed actuator including a second feed cylinder that is selectively operable to move the clamped clinch nut downwardly from between the pair of clamp members for delivery to the robot end effector tool within the delivery member opening.

14. A vehicle body sheet metal clinch nut feeder, comprising:
    a support;
    a dispensing head;
    an alignment mount including a mounting block mounted on the support, a first mount member having a first pivot connection to the mounting block on the support for pivoting about a first vertical axis, the alignment mount including a second mount member having a second pivot connection on the first mount member for pivoting about a second pivotal axis spaced from the first pivotal axis, and the dispensing head being mounted on the second mount member for pivoting about the first and second vertical axes to provide the horizontal alignment movement;
    the dispensing head having an inlet passage through which oriented clinch nuts to be fed are received and moved single file;
    a clamp mounted on the dispensing head and including a pair of clamp members located laterally to one side of the inlet passage;
    a resilient bias that resiliently biases one of the pair of clamp members toward the other;
    a first feed actuator including a first feed cylinder and a first feed member, and the first feed cylinder having a piston connecting rod that is connected to the first feed member and selectively moved by the first feed cylinder to move the leading clinch nut in the inlet passage laterally from the inlet passage to between the pair of clamp members for clamping therebetween by the operation of the resilient bias;
    a delivery member on the dispensing head below the clamp members and having an opening for receiving a robot end effector tool as the alignment mount permits any necessary horizontal alignment movement of the dispensing head; and
    a second feed actuator including a second feed member and a second feed cylinder, a lever including first and second ends and an intermediate portion pivotally supported on the dispensing head by a pivotal connection, another pivotal connection that pivotally connects the second feed actuator cylinder to the first end of the lever, and a further pivotal connection that pivotally connects the second end of the lever to the second feed member to selectively move the second feed member downwardly to move the clamped clinch nut downwardly from between the pair of clamp members for delivery to the robot end effector tool within the delivery member opening.

* * * * *